(12) United States Patent
Durand et al.

(10) Patent No.: US 9,026,804 B2
(45) Date of Patent: May 5, 2015

(54) METHODS AND APPARATUS FOR PROTECTED DISTRIBUTION OF APPLICATIONS AND MEDIA CONTENT

(75) Inventors: Julian Durand, San Diego, CA (US); Jason B. Kenagy, La Jolla, CA (US); Per Nielsen, Chula Vista, CA (US); Christophe Bernard, San Diego, CA (US); Amy McGaraghan, Berkeley, CA (US); Bryan L. Campbell, Portsmouth, NH (US)

(73) Assignee: QUALCOMM Incorporated, San Diego, CA (US)

(*) Notice: Subject to any disclaimer, the term of this patent is extended or adjusted under 35 U.S.C. 154(b) by 2826 days.

(21) Appl. No.: 11/361,154

(22) Filed: Feb. 24, 2006

(65) Prior Publication Data
US 2007/0208953 A1 Sep. 6, 2007

(51) Int. Cl.
*G06F 12/14* (2006.01)
*G06F 21/10* (2013.01)

(52) U.S. Cl.
CPC ........ *G06F 21/10* (2013.01); *G06F 2221/2111* (2013.01)

(58) Field of Classification Search
USPC ............................... 726/22–33; 713/189–193
See application file for complete search history.

(56) References Cited

U.S. PATENT DOCUMENTS

| | | | |
|---|---|---|---|
| 5,774,651 A | 6/1998 | Akiyama et al. | |
| 5,842,023 A | 11/1998 | Tsumura | |
| 6,438,235 B2 * | 8/2002 | Sims, III | 380/285 |
| 6,832,318 B1 | 12/2004 | Yaegashi et al. | |
| 6,920,222 B1 * | 7/2005 | Tsukahara et al. | 380/239 |
| 7,752,462 B2 * | 7/2010 | Fukushima | 713/193 |
| 2002/0120722 A1 | 8/2002 | Kutaragi et al. | |
| 2005/0216739 A1 | 9/2005 | Lee et al. | |

FOREIGN PATENT DOCUMENTS

| | | |
|---|---|---|
| JP | 3040689 A | 2/1991 |
| JP | 9091133 A | 4/1997 |
| JP | 9160899 A | 6/1997 |
| JP | 10241288 A | 9/1998 |
| JP | 2000138664 A | 5/2000 |
| JP | 2001282258 A | 10/2001 |
| JP | 2002279102 | 9/2002 |
| JP | 2002312054 A | 10/2002 |
| JP | 2003348076 A | 12/2003 |
| JP | 2004362721 A | 12/2004 |

(Continued)

OTHER PUBLICATIONS

International Search Report—PCT/US07/062826, International Search Authority, European Patent Office, Aug. 27, 2007.
Written Opinion—PCT/US07/062826, International Search Authority, European Patent Office, Aug. 27, 2007.
International Preliminary Report on Patentability—PCT/US07/062826, International Preliminary Examining Authority, European Patent Office, Munich—May 21, 2008.

(Continued)

*Primary Examiner* — Amare F Tabor
(74) *Attorney, Agent, or Firm* — Fariba Yadegar-Bandari

(57) ABSTRACT

Methods, devices, apparatus, computer-readable media and processors are provided that protect the distribution of media content. Media content is encrypted and the associated cryptographic mechanisms are stored and accessible either remotely at a networked database or internally within a data storage device memory. Access to the cryptographic mechanisms is granted by associating the cryptographic mechanisms with a data storage device identification and, optionally, a computing device identification.

61 Claims, 12 Drawing Sheets

(56) References Cited

FOREIGN PATENT DOCUMENTS

| WO | 2005112598 A1 | 12/2005 |
| WO | 2007101166 A2 | 9/2007 |

OTHER PUBLICATIONS

European Search Report—EP13150446—Search Authority—Munich—Jun. 21, 2013.

* cited by examiner

METHODS AND APPARATUS FOR PROTECTED DISTRIBUTION OF APPLICATIONS AND MEDIA CONTENT

FIELD OF INVENTION

The described aspects relate generally to protected distribution of media content in a network environment. More particularly, the described aspects relate to protected distribution of media content and applications on a removable data storage device.

BACKGROUND

Removable data storage devices, such as compact disc (CDs), digital video discs (DVDs), flash media cards and the like have become increasingly more prevalent in the distribution of digital media content, such as music files, video files, multimedia files, video gaming applications, business applications, text files and the like. These types of data storage devices afford the media distributor a relatively inexpensive medium for physical data storage, while affording the user of the removable data storage device a means for interfacing the storage device with a wide variety of computing devices, such as desktop computers, laptop computers, video game consoles, handheld computing devices and the like.

One on-going concern of the media content providers is the protection of intellectual property rights associated with the media content. If the content can readily be moved between computing devices and, thus, between users, the copyright and patent protection (i.e., the digital rights) associated with the media content and/or applications may be compromised. Current means for distributing data in protected environment that insures strong intellectual property protection are either cost prohibitive and/or technically prohibitive. Realizing that removable data storage devices are generally inexpensive devices, content providers are reluctant to implement methods for intellectual property protection that may add cost to the devices.

In addition to content provider concerns with the protection of intellectual property rights, the user of the content desires a protection means that does not otherwise burden their access to the media content. User-friendly access to the content is important from a device marketability standpoint, insuring that the user continues to purchase data storage devices of this type. Thus, a need exists to develop intellectual property protection means that are seamlessly operable and, as such, provide minimal burden to the user of the storage device.

Other protection concerns may also be related to removable data storage devices depending on the type and form of content stored on the device. In this regard, data storage devices that store large media files and or objects may pose additional concerns. For example, a content provider may provide a large amount of media content, applications or files in a single data storage device. Some of the content, such as executable files and the like, may require protection, while other content, such as resource files and the like, may not warrant protection. Being able to limit protection to content of interest provides many benefits. For example, by limiting protection to only relevant content (e.g. the music file, the video file, the video game application), the remaining content may be accessible to multiple users and the remaining content may entice the additional users to purchase the protected content. Additionally, by limiting the protected content to only relevant content, the overall process of converting the content from protected to un-protected content is streamlined, thus adding to the efficiency of the process and making the user experience more friendly.

In addition, large media flies and/or applications may warrant individual protection for designated portions of the content. By developing methods and processes that allow for individual protection of various portions of content, new and innovative business models may be devised to provide users access to such content. For example, in today's video gaming market, users that wish to purchase additional features or upgrades to a video game application are typically required to purchase an additional data storage device that warrants a return visit to the video game retailer. Therefore, a need exists to provide a data storage device that allows the user on-demand access to additional features, upgrades, etc., thus, eliminating the need for the user to re-visit the retail outlet or otherwise find a purchasing option for the additional features.

Therefore, a need exists to develop a means for implementing data protection in removable data storage devices that affords the content provider a reasonable solution from a cost perspective and affords the device user a user-friendly means of accessing the protected content. Additionally, a need exists to provide a data storage device that includes storage of a large volume of content/applications, some of which require protection and some of which do not require protection. Also, a need exists to develop methods and apparatus for providing on-demand protected access to additional features or content related to main content stored on the data storage device.

SUMMARY

Thus, devices, methods, apparatus, computer-readable media and processors are presented that provide data protection in removable data storage devices, such as CDs, DVDs, flash media cards and the like. The data protection that is afforded is both simplistic in technological design and reasonable from a cost implementation standpoint. The devices, methods, apparatus, computer-readable media and processors can be configured to provide protection to only those portions of content stored on the device that require such protection, thereby, allowing for un-protected content to remain accessible to all users. Additionally, the methods, apparatus, computer-readable media and processors may be configured to limit the access to the protected content based on association of the storage device with one or more computing devices. Also, the methods, apparatus, computer-readable media and processors may be configured to provide individual protection to portions of the content stored on the devices, thus, limiting user access to individual portions of the content based upon the licensing rights of the user.

In some aspects, a method for obtaining content in a protected environment comprises receiving a storage device comprising a storage device identifier and protected content. The method further includes forwarding the storage device identifier to a network device. Further, the method includes receiving at least a reference to a cryptographic mechanism from the network device based on an association with the storage device identifier. Additionally, the method includes accessing at least a portion of the protected content with the cryptographic mechanism. In a related aspect, a computer readable medium tangibly stores a sequence of instructions that, when executed, cause a computer device to perform the actions described above. In a further related aspect, at least one processor may be configured to perform the operations described above.

In other aspects, a wireless device comprises means for receiving a storage device comprising a storage device identifier and protected content. The wireless device further comprises means for forwarding the storage device identifier to a network device, and means for receiving at least a reference to a cryptographic mechanism from the network device based on an association with the storage device identifier. Additionally, the wireless device includes means for accessing at least a portion of the protected content with the cryptographic mechanism.

In yet other aspects, a computing device, such as wireless device, a desktop computer, a laptop device, a gaming console or the like, comprises a processing engine and a content access initiator module executable by the processing engine. The content access initiator being operable to recognize protected content stored on a storage device, communicate a storage device identifier to a network device, receive from the network device at least a reference to a first cryptographic mechanism associated with the storage device identifier and apply the first cryptographic mechanism to at least a portion of the protected content to convert the portion of the protected content to a portion of un-protected content In still other aspects, a method for distributing content in a protected environment comprises obtaining an association between a first storage device identifier and a cryptographic mechanism, and obtaining at least a reference to the cryptographic mechanism. The method further includes receiving a request from a computing device for access to at least a portion of a protected content, where the request comprises a second storage device identifier. Additionally, the method includes forwarding at least the reference to the cryptographic mechanism to the computing device based on a correspondence between at least a portion of the second storage device identifier and the first storage device identifier. In a related aspect, a computer readable medium tangibly stores a sequence of instructions that, when executed, cause a computer device to perform the actions described above. In a further related aspect, at least one processor may be configured to perform the operations described above.

In further aspects, a network device, such as a network server or any other device capable of being networked with a computing device is defined. The network device comprises means for obtaining an association between a first storage device identifier and a cryptographic mechanism, and means for obtaining at least a reference to the cryptographic mechanism. The network device further includes means for receiving a request from a computing device for access to at least a portion of a protected content, the request comprising a second storage device identifier. Additionally, the network device includes means for forwarding at least the reference to the cryptographic mechanism to the computing device based on a correspondence between at least a portion of the second storage device identifier and the first storage device identifier.

In other aspects, a network device comprises a processing engine and a personalization module executed by the processing engine. The personalization module being operable to receive a storage device identifier from a networked computing device, determine a cryptographic mechanism associated with the storage device identifier and communicate at least a reference to the cryptographic mechanism to the computing device.

In still other aspects, a method of distributing content comprises loading unprotected content on a storage device having a storage device identifier, the storage device configured for removable communication with a computing device. The method further includes obscuring at least a portion of the unprotected content with a cryptographic mechanism, thereby defining at least a portion of a protected content. Also, the method includes defining an association between the storage device identifier and the cryptographic mechanism. Additionally, the method includes forwarding the defined association to a network device operable to provide access to at least the portion of the protected content to a networked computing device having the storage device identifier.

In some aspect, a data storage device, such as media card, CD, DVD, game cartridge or the like, includes a memory comprising a data storage device identifier and protected content, such as encrypted content. The data storage device identifier may be a serial number or and other identifier associated with the device. The protected content is convertible to unprotected content by communicating the identifier to a network device that responds with a cryptographic mechanism associated with the identifier.

Thus, the described aspects provide for a cost effective and efficient means for protecting content stored on removable data storage devices.

BRIEF DESCRIPTION OF THE DRAWINGS

The disclosed aspects will hereinafter be described in conjunction with the appended drawings, provided to illustrate and not to limit the disclosed aspects, wherein like designations denote the elements, an in which.

DETAILED DESCRIPTION

The present devices, apparatus, methods, computer-readable media and processors are described with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Further, in this description, like numbers refer to like elements throughout.

The present devices, apparatus, methods, computer-readable media and processors provide for protected distribution of content that is stored in removable data storage devices, such as magnetic media, optical media, tape, soft disk, hard disk or the like. For example, the removable data storage device may take the form of a CD, DVD, flash media card or the like. Content, as referred to herein, encompasses any digital media file, application, routine, data or other information, executable or non-executable that may be stored on a data storage device. Further, protected content, as referred to herein, comprise a secured and/or obscured form of the content, such as may be obtained by encrypting the content, hashing the content, ciphering the content, etc. Additionally, key, as referred to herein, comprises a cryptographic mechanism to transform unprotected content into and/or out of protected content, such as an encryption algorithm applied to the content, a hash, a cipher, a public key, a private key, a symmetric key, etc.

Figure 1:
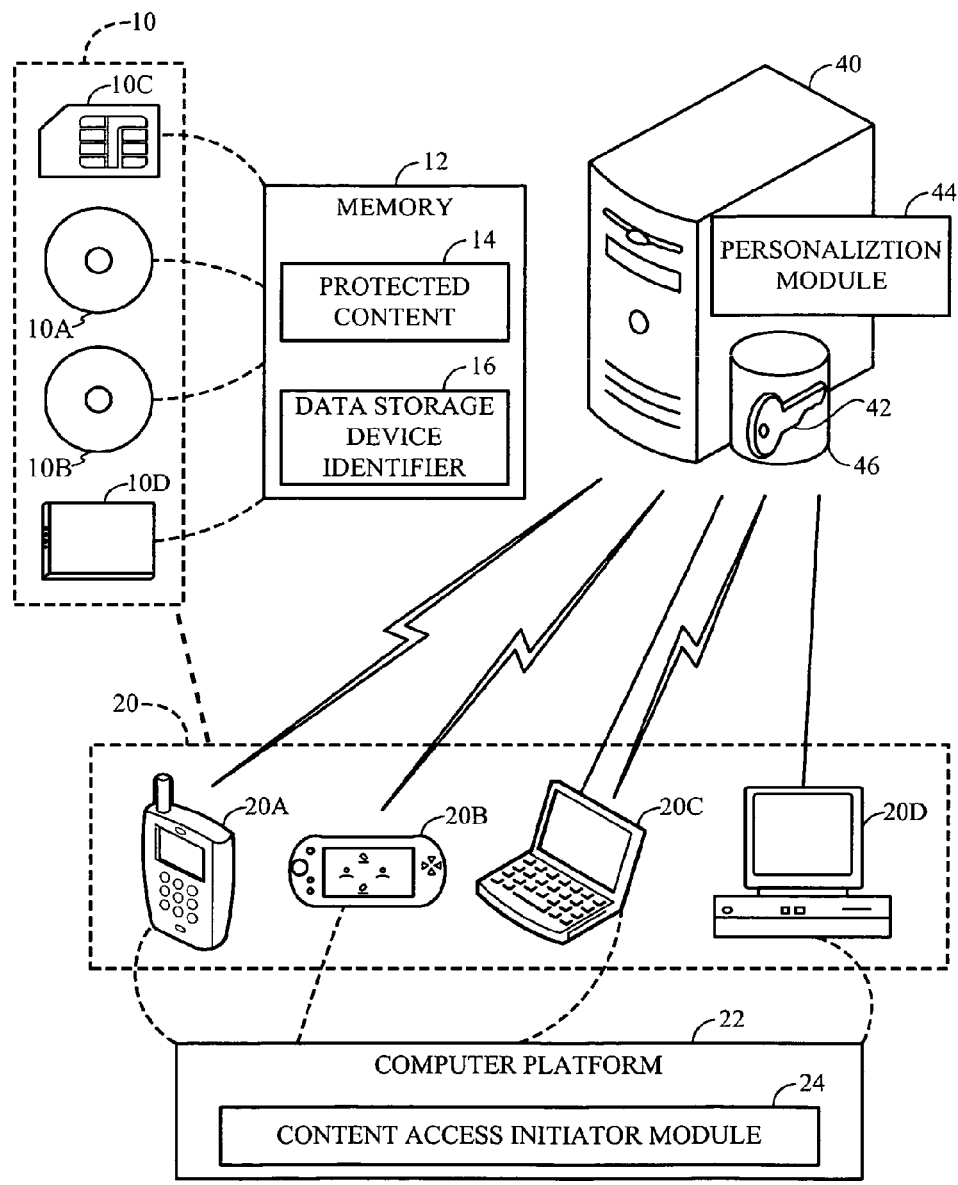
FIG. 1 illustrates one aspect of a general system for providing content distribution in a protected environment.

Referring to FIG. 1, in one aspect, a system for providing protected distribution of content is schematically illustrated. The system includes removable data storage device 10, such as CD 10A, DVD 10B, flash media card 10C or smart card 10D. The removable data storage devices shown in FIG. 1 are by way of example only, other removable data storage devices are also contemplated and within the scope of the present aspects. The removable data storage device includes memory 12 that stores protected content 14 and a data storage device identifier 16. Protected content is the term herein used to refer to all content that is protected from user access; typically protected content may take the form of coded or ciphered content (i.e., encrypted content). The data storage identifier 16 is typically a data storage device serial number or some other identifier that will uniquely differentiate the data storage device from other data storage devices.

The removable data storage device 10 is in data communication with the computing device 20. The computing device may include wireless communication device 20A, wireless gaming device 20B, laptop computer 20C or desktop computer 20D. The computing devices shown in FIG. 1 are by way of example only, other computing devices are also contemplated and within the scope of the present aspects. In many aspects, data communication between the data storage device and the computing device requires the storage device to be removably secured within the computing device. However, in other aspects it is also possible for the system to be configured such that the storage device is in wired or wireless data communication with the computing device while the storage device is remote from the computing device. For example, the data storage device may be configured to communicate with the computing device via short-range communication, such as via infrared (IR) waves, Bluetooth® protocol messages, Wi-Fi technology, Wi-Max technology, or the like.

The computing device 20 includes a computer platform 22 that provides for the execution of content access initiator module 24. Content access initiator module 24 includes executable instructions for recognizing protected content 14 on a data storage device 10 in communication with the computing device, communicating the data storage device identifier 16 to a network device 40 in response to the recognition of protected content, receiving one or more content keys 42 from the network device in response to the communication of the identifier 16 and applying the one or more keys to the protected content 14 for the purpose of accessing the content.

The system may also include the network device 40, such as a network server that is in network communication with the computing device 20. The network device executes personalization module 44, which determines associations between data storage device identifiers 16 and content keys 42. Once the personalization module determines association between data storage device identifiers 16 and content keys 42, the personalization module may retrieve the one or more content keys from network database 46. In turn, the network device 40 may communicate the one or more content keys 42 to the computing device, which applies the one or more keys to the protected content 14 for the purpose of converting the protected content to user-accessible un-protected content. The network device shown in FIG. 1 is by way of example only, any device capable of being networked to the computing device 20 and capable of executing personalization module 44 are also contemplated and within the scope of the present aspects. As dictated by the functionality of the computing device, the network device may be in wired, wireless or both wired and wireless communication with the computing device.

Figure 2:
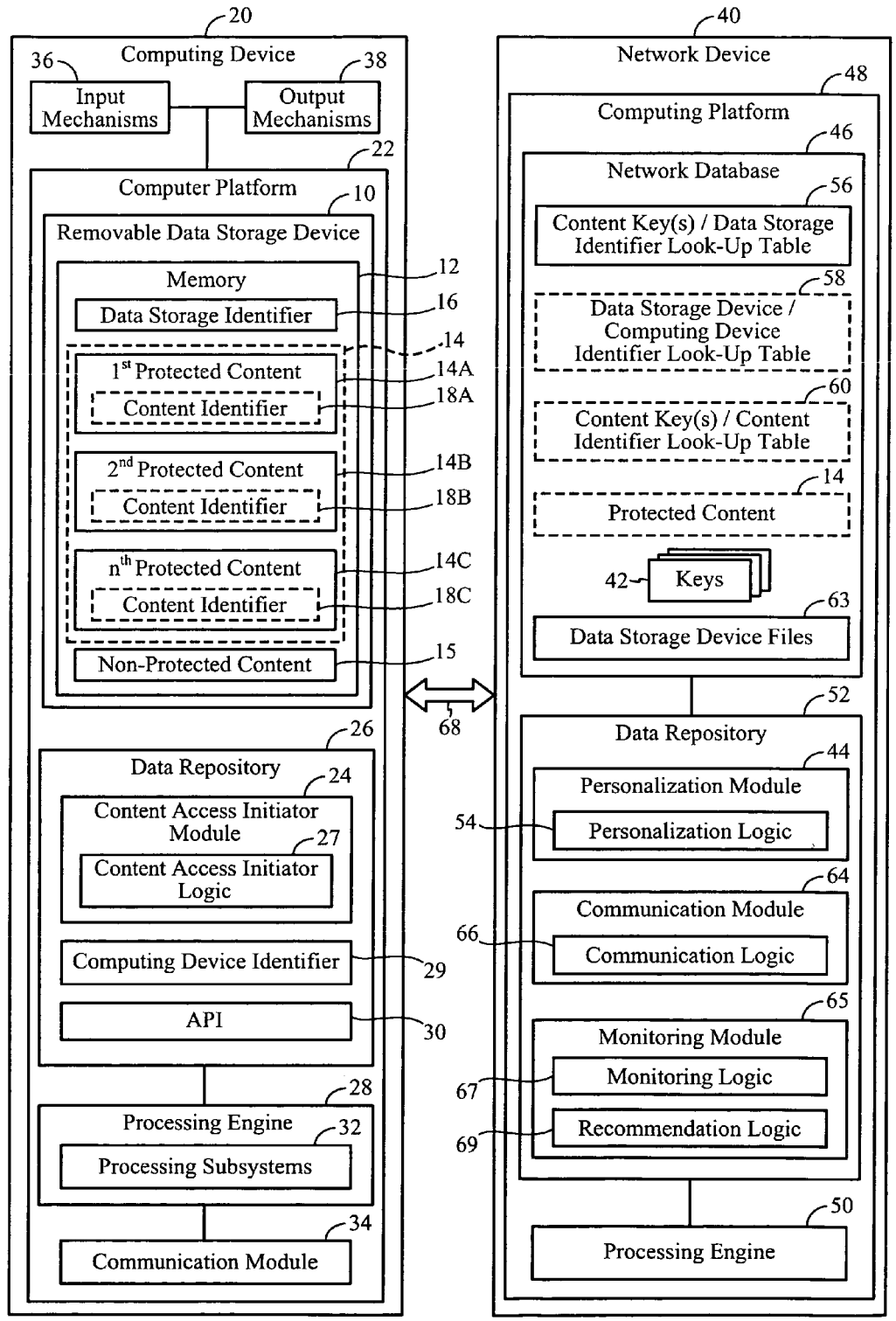
FIG. 2 is a block diagram of one aspect of a system for providing content distribution in a protected environment.

In accordance with the system aspect, FIG. 2 provides a more detailed block diagram of the system for providing protected distribution of content. The removable data storage device 10 may include memory 12, such as flash, read-only and/or random-access memory (RAM and ROM), EPROM, EEPROM or the like, that stores protected content 14 and a data storage device identifier 16. As illustrated, the data storage device 10 may store a single entity of protected content, such as first protected content 14A or the data storage device may optionally store a plurality of protected content, such as second protected content 14B and nth protected content 14C. In aspects in which the data storage device stores a plurality of protected content, each protected content portion or entity may, optionally, have an associated protected content portion identifier 18A, 18B and 18C. The protected content portion identifiers may be associated with one or more content keys 42 that are applied to the protected content portion to convert the content to un-protected content.

In some aspects all of the content stored on the data storage device 10 may be protected content, while in other aspects the data storage device 10 may store additional non-protected content 15. The non-protected content 15 may be content that is readily accessible to all users at any time. For example, the non-protected content 15 may be a media player application and the protected content 14 may be one or more media files (e.g., music files, video files or the like). Alternatively, the non-protected content 15 may be files, applications, routines or the like that are used in conjunction with the protected content 14 once the protected content 15 has been converted to non-protected content. For example, the data storage device 10 may store a large quantity of applications and/or media resources, where the core applications may be protected and the resource files may be non-protected. Once access has been granted to the protected core applications, the core applications are deemed to be executable and may utilize the non-protected resource files during execution.

In some aspects, the non-protected content 15 may include a preview of the protected content 14 stored on the storage device 10 and/or a preview of additional related content that is either stored and protected on the storage device or stored remotely at a network device, such as additional versions of a gaming application, additional related music or video files or the like. In such aspects, the non-protected content may include an embedded link that provides the user access to a network server or network site for the purpose of purchasing the protected content and/or additional related content. In aspects in which the non-protected content 15 includes a preview of the protected content 14, the data storage devices may be gratuitously distributed to potential content buyers, with the non-protected preview content acting as an enticement to purchase the protected content. In other aspects in which the non-protected content is a preview of additional related content (i.e., content not originally purchased by the buyer of the data storage device), the additional content may be additional protected content stored on the data storage device or the additional content may be remotely stored content that is downloaded to the computing device 20 upon purchase.

Additionally, in some aspects the non-protected content 15 may include limited-use of the protected content 14 stored on the storage device 10 and/or limited-use of additional related content that is either stored and protected on the storage device or stored remotely at a network device. For example, the non-protected content 15 may include a limited-use gaming application, music file, video file or the like. In such aspects, the data storage device 10 may be configured such that the non-protected content 15 has limited-use, such as: a predetermined finite number of uses or plays; a predetermined limited time period in which the non-protected content may be available; a predetermined set of functionality less than the full functionality of the protected content; and, an accessibility to a predetermined limited portion of the full amount of content. Alternatively, in other aspects, the data storage device 10 may be configured such that limited-use of the non-protected content is associated with the computing device. For example, a non-protected music file may be limited to two plays per computing device, thus, allowing for the non-protected music file to be played up to two times on any accommodating computing device. In such aspects, the network device 40 may provide for the tracking of limited-use to computing device by requiring the computing device to communicate a device identifier to the network device upon initial activation of the non-protected limited-use content.

The system additionally includes a computing device 20 that has a computer platform 22 that can transmit and receive data across network 68, and execute routines and applications stored in computing device data repository 26 or data storage device memory 12. The data repository 26 stores content access initiator module 24 that provides instructions that are executed by content access initiator logic 27 for recognizing protected content on data storage devices that are read by the computing device, communicating the data storage device identifier to a network device in response to the recognition of protected content; receiving one or more content keys from the network device in response to the communication of the identifier and applying the one or more keys to the protected content for the purpose of accessing the content. In other aspects, the content access initiator module 24 may be stored on the data storage device as non-protected content 15.

The data repository 26 may typically also store a computing device identifier 29. In some aspects, the computing device identifier may be implemented to associate the computing device with data storage device and/or the content keys.

The data repository 26, which may comprise volatile and nonvolatile memory such as read-only and/or random-access memory (RAM and ROM), EPROM, EEPROM, flash cards, or any memory common to computer platforms. Further, data repository 26 may include one or more flash memory cells or may be any secondary or tertiary storage device, such as magnetic media, optical media, tape, or soft or hard disk.

Further, computer platform 22 also includes at least one processing engine 28, which may be an application-specific integrated circuit ("ASIC"), or other chipset, processor, logic circuit, or other data processing device. Processing engine 28 or other processor such as ASIC may execute an application programming interface ("API") layer 30 that interfaces with any resident or non-resident programs, such as content access initiator module 24, stored in a data repository 26 of the computing device 20 or in the memory 12 of the data storage device 10. In aspects in which the computing device is a wireless computing device, the API 30 is typically a runtime environment interface executing on the computing device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processing engine 28 typically includes various processing subsystems 32 embodied in hardware, firmware, software, and combinations thereof, that enable the functionality of computing device 20 and the operability of the computing device on network 68. For example, processing subsystems 32 allow for initiating and maintaining network communications, and exchanging data, with other networked devices. In one aspect, in which the computing device is embodied by a wireless communication device, communications processing engine 28 may include one or a combination of processing subsystems 32, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc. For the disclosed aspects, processing subsystems 32 of processing engine 28 may include any subsystem components that interact with applications executing on computer platform 22. For example, processing subsystems 32 may include any subsystem components, which receive data reads, and data writes from API 30 on behalf of the content access initiator module 24.

Computer platform 22 may further include a communications module 34 embodied in hardware, firmware, software, and combinations thereof, that enables communications among the various components of the computing device 20, as well as between the device 20 and the network 68. The communication module may include the requisite hardware, firmware, software and/or combinations thereof for establishing a wireless communication connection.

Additionally, computing device 20 may include input mechanism 36 for generating inputs into wireless device, and output mechanism 38 for generating information for consumption by the user of the computing device. For example, input mechanism 36 may include a mechanism such as a key or keyboard, a mouse, a touch-screen display, a microphone in association with a voice recognition module, etc. Further, for example, output mechanism 38 may include a display, an audio speaker, a haptic feedback mechanism, etc.

The system additionally includes a network device 40 that has a computing platform 48 that can transmit and receive data across network 68. The computer platform 48 includes a processing engine 50 that is capable of executing modules, routines and/or applications stored in network device data repository 52 or in network database 46. The processing engine 50 may be an application-specific integrated circuit ("ASIC"), or other chipset, processor, logic circuit, or other data processing device. The network database 46 may reside in a device remote from the network device 40 or the database may reside internally within the network device. In aspects in which the database 46 resides internally within the network device 40 the database may be included within the data repository 52.

The data repository 52 may comprise volatile and nonvolatile memory such as read-only and/or random-access memory (RAM and ROM), EPROM, EEPROM, flash cards, or any memory common to computer platforms. Further, data repository 26 may include one or more flash memory cells or may be any secondary or tertiary storage device, such as magnetic media, optical media, tape, or soft or hard disk. The data repository 52 may include a personalization module 44 that includes instructions utilized by the personalization logic 54 for determining associations between data storage devices 10 and content keys 42. In alternate aspects, the personalization module 44 may also determine associations between computing devices 20 and data storage devices 10 and/or associations between protected content portions 18 and content keys 42. The personalization module 44 determines associations by accessing the network database 48 and locating associations within a specific look-up table or some other form of association element. As such, the network database may include a data storage device identifier 16 and content key look-up table 56 for determining associations between data storage devices 10 and content keys 42. In alternate aspects, the network database may include data storage device identifier 16 and computing device identifier look-up table 58 for determining associations between data storage devices 10 and computing device 20. In still further aspects, the network database 46 may include protected content portion identifier (18A; 18B; 18C) and content key look-up table 60 for determining associations between protected content portions 18 and content keys 42.

In some aspects, the network database may also store the protected content 14 for the purpose of initially downloading the protected content to data storage devices and/or updating/replacing the protected content on the data storage devices. For example, if the user of the data storage device 10 misplaces, loses or otherwise no longer has possession of the data storage device the user may be able to contact the network device and retrieve the protected content based on the computing device identifier or a user identifier that associates either the computing device or the user with the protected content.

Additionally, the network database may also store individual data storage device files 63, which provide the remote storage of parameters, settings and the other information related to the protected content. For example, if the protected content 14 is a gaming application the data storage device files may store game settings, levels of the game achieved, an interrupted game or the like. By providing for remote storage of files 63, the network device may limit the storage ability of the computing device 20 and/or serve as a back-up storage device. For example, if a user loses possession of the data storage device and requires a replacement device or purchases an updated or new version of the initial data storage device, the network device can initially recognize the user or the computing device and apply the settings in the data storage device files 63 to the content found in the replacement device, updated device or new version/sequel device.

The network device may additionally include a monitoring module 65 that includes instructions utilized by the monitoring logic 67 for monitoring the use of content on the computing device 20. In this regard the monitoring module acknowledges the content stored on the data storage device 10 and any other content accessed or otherwise executed by the computing devices. Additionally, the monitoring module may monitor environmental attributes of the computing device, such as the geographic location of the wireless device, movement of the device, point-in-time of the device, etc. Monitoring of the content accessed or used by the computing devices may be accomplished by uploading logs from the computing device or otherwise communicating with the computing device. Based on content stored on the data storage device and any other content accessed or otherwise executed by the computing device, the recommendation logic 69 will push recommendations for other similar content to the device, such as similar music files, audio files, gaming applications or the like. Additionally, the monitoring module 65 may use the environmental data to base the recommendation on the environmental attributes of the computing device, such as the location of the device, the time of day or the like.

The data repository 52 may additionally include a communication module 64 that includes instructions utilized by the communication logic 66 for receiving identifier communications from computing devices and transmitting content key communications to computing devices. The communications module 64 may embodied in hardware, firmware, software, and combinations thereof, that enables communications among the various components of the network device 40, as well as between the device 40 and the network 68. The communication module may include the requisite hardware, firmware, software and/or combinations thereof for establishing a wireless and/or wired communication connection.

Figure 3:
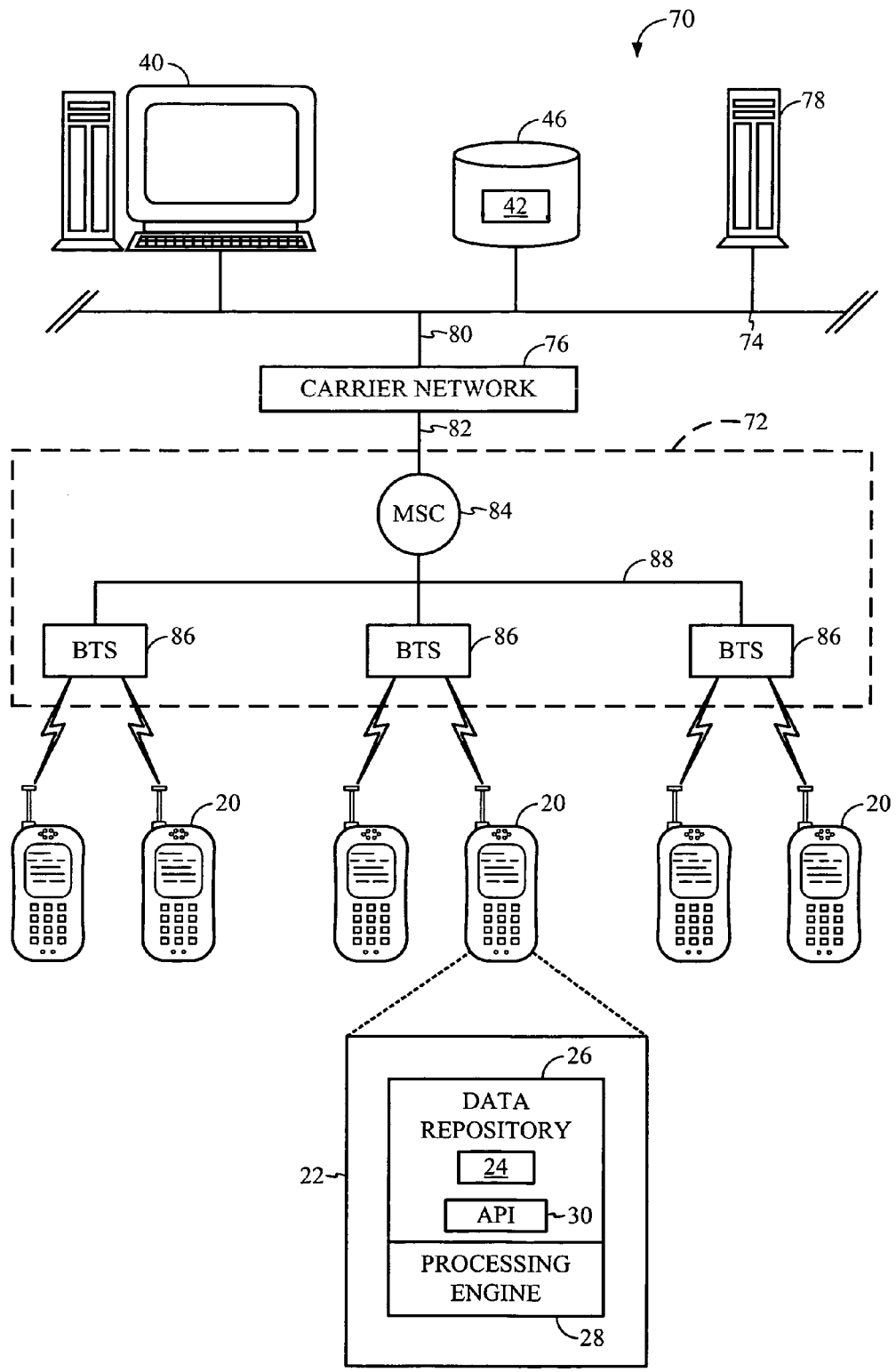
FIG. 3 illustrates one aspect of a wireless network, specifically a cellular device network, associated with the computing device of FIG. 2.

In one aspect, a method for protected distribution of content in a wireless network environment is provided. FIG. 3 provides a block diagram of an illustrative wireless system, specifically a cellular telephone system. As previously noted, the aspects herein disclosed are not limited to a wireless network environment and may also be implemented in a wired network environment. Network communication, according to the present aspects, includes, but is not limited to, communicating the identifiers (i.e., the data storage identifier, the computing device identifier and/or or the protected content portion identifiers) to the network device and communicating the control keys from the network device to the computing device.

Referring to FIG. 3, in one aspect, computing device 20 comprises a wireless communication device, such as a cellular telephone. A cellular telephone system 70 may include wireless network 72 connected to a wired network 74 via a carrier network 76. Wireless communication devices 20 are being manufactured with increased computing capabilities and often can communicate packets including voice and data over wireless network 72. As described earlier, these "smart" wireless devices 20 have APIs 30 resident on their local computer platform 22 that allow software developers to create software applications that operate on the wireless communication device 20, and control certain functionality on the device. FIG. 3 is a representative diagram that more fully illustrates the components of a wireless communication network and the interrelation of the elements of one aspect of the present system. Wireless network 72 is merely exemplary and can include any system whereby remote modules, such as wireless communication devices 20 communicate over-the-air between and among each other and/or between and among components of a wireless network 72, including, without limitation, wireless network carriers and/or servers.

In system 70, network device 40 can be in communication over a wired network 74 (e.g. a local area network, LAN) with a separate network database 46 for storing content keys 42 and associated look-up tables. Further, a data management server 78 may be in communication with network device 40 to provide post-processing capabilities, data flow control, etc. Network device 40, network database 46 and data management server 78 may be present on the cellular telephone system 70 with any other network components that are needed to provide cellular telecommunication services. Network device 40, and/or data management server 78 communicate with carrier network 76 through a data links 80 and 82, which may be data links such as the Internet, a secure LAN, WAN, or other network. Carrier network 76 controls messages (generally being data packets) sent to a mobile switching center ("MSC") 84. Further, carrier network 76 communicates with MSC 84 by a network 82, such as the Internet, and/or POTS ("plain old telephone service"). Typically, in network 82, a network or Internet portion transfers data, and the POTS portion transfers voice information. MSC 84 may be connected to multiple base stations ("BTS") 86 by another network 88, such as a data network and/or Internet portion for data transfer and a POTS portion for voice information. BTS 86 ultimately broadcasts messages wirelessly to the wireless communication devices 20, by short messaging service ("SMS"), or other over-the-air methods.

Figure 4:
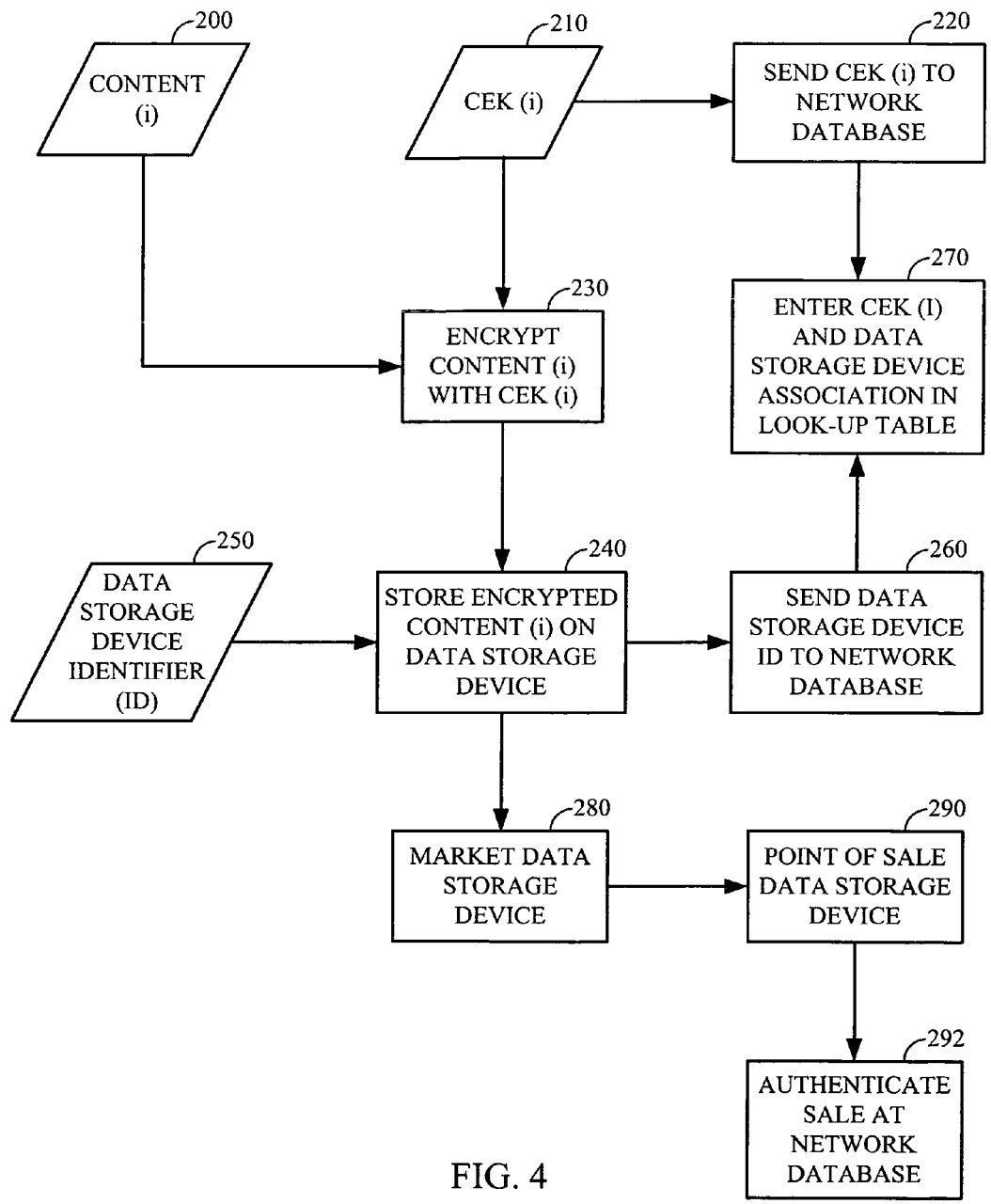
FIG. 4 is a flow diagram of one aspect for provisioning a removable data storage device.

FIG. 4 provides a flow diagram of an aspect for provisioning data storage devices with protected content and the association of the data storage devices to the protected content keys. Referring primarily to FIG. 4, and secondarily to FIGS. 1 and 2, data element 200 is the content (i) for which the content provider desires protection. As previously discussed the data may be all of the content that the provider stores on the data storage device or any portion of the content stored on the device. Exemplary content includes, but is not limited to, music files, video files, multimedia files, executable files and the like. Data element 210 is the content encryption key (CEK) (42). In the illustrated aspect, a conventional encryption algorithm, such as a XOR encryption algorithm, generates the CEK resulting in a random key. Key length may be determined based the degree of security desired, in some aspects, a key length of 128 bits may provide requisite security. It should be noted that content may be encrypted with multiple keys for additional security.

In alternate aspects, the content encryption key may be generated using the identifier of the data storage device or the computing device. In these aspects, the identifier is used as the "seed" in an encryption algorithm to generate the encryption key. In these alternate aspects, the encryption keys may be generated at further stages in the process, such as at the point the content is stored on the data storage device or at the point the data storage device is placed in communication with the computing device. In such alternate aspects, it may be possible to obviate the need for a "store-forward" approach by storing the key on the data storage device or on the computing device. In such aspects, in which the key is stored and retrieved from the data storage device or the computing device, the need for back-end network storage and retrieval of the content keys is obviated and, hence, not a required element of the process or system.

At Event 220, the content encryption key is communicated to a network database (46) for subsequent association with data storage device identifiers. The content encryption key may be communicated to the network database electronically over a communications network or the key may be communicated manually by data entry function.

At Event 230, the encryption key (or encryption keys) (42) are applied to the content resulting in protected content (14), i.e., encrypted content and, at Event 240, the protected content (14) is stored on a data storage device. Data Element 250 represents the unique identifier (16) associated with each data storage device, typically a serial number or the like associated with the data storage device. The unique identifier is stored as metadata within the device memory. Additionally, it should be noted that Event 240 may optionally include storing non-protected content (15) on the data storage device. As previously noted, the non-protected data may include a preview of the protected content, and/or additional protected content stored either on the data storage device or on a remote server. Additionally, in aspects in which the non-protected content includes a preview, an embedded link may be provided for access and/or purchase of the full content. The non-protected content may additionally provide for limited-use content that is accessible to the user of the storage device for a limited number of uses.

At Event 260, the data storage identifier, along with the CEK or an appropriate CEK identifier, is communicated to the network database (46) and, at Event 270, the association between CEK (i) and the data storage device is entered into a corresponding CEK and data storage device look-up table (56). Association between the CEK (i) and the data storage device is accomplished by a personalization module (44) that is executed at a network device and is in network communication with the network database (46).

At optional Event 280, the data storage device (10), which includes protected content (14) in memory (12), is marketed through a conventional sales outlet or otherwise placed in the commercial marketplace. In other aspects, the data storage device may be procured by a user without a commercial transaction transpiring, for example, in those instances in which the data storage device is not used for commercial gain or is otherwise offered to the user without compensation. At optional Event 290, the data storage device is purchased by a user or otherwise lawfully procured by a user. For example, the data storage device with protected content may be purchased in a commercial sale or transferred to employees of an enterprise. At optional Event 292, the purchase, lawful procurement, transfer and/or exchange of the data storage device may be authenticated by communicating the sale, procurement, transfer and/or exchange transaction and the device identifier to the network database (46).

Figure 5:
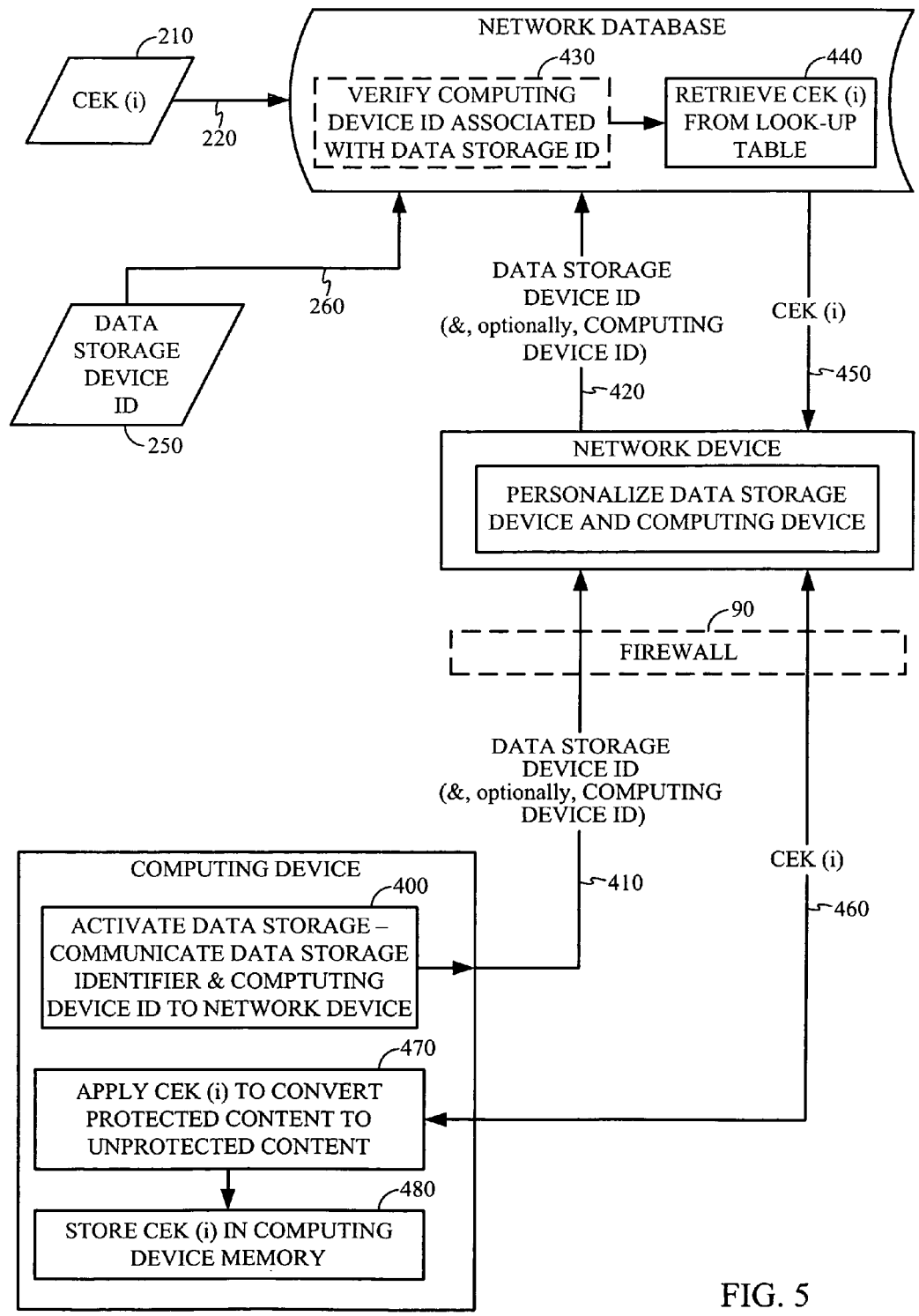
FIG. 5 is a flow diagram of aspects for personalizing a removable data storage device, a computing device and protected content in a communications network.

Referring primarily to FIG. 5, and secondarily to FIGS. 1 and 2, according to one aspect, a process includes the personalization of protected content (14) stored on a data storage device (10) and the subsequent accessing of the content. At Event 400, the data storage device is activated by placing the storage device in communication with a computing device (20). In many aspects, the computing device may include a receptacle for receiving and securing a removable data storage device, such as a CD, DVD, flash media card or the like. However, in alternate aspects, the computing device may include short-range communication functionality, such as IR or Bluetooth® communications, that allows for the computing device to read data without coming into physical contact with the storage device. Once the data storage is initially read, a protected access initiator module (24) that resides on the computing device, on the storage device or on an associated network is executed on the computing device to recognize protected content.

Once protected content has been recognized at the computing device, at Event 410, the computing device communicates the storage device identifier (16), and alternately the computing device identifier (29) associated with the respective computing device (20), to a network device (40). Network device (40), for example, may exist in a wired or wireless network, optionally beyond a suitable firewall (90). Receipt of the storage identifier and, optionally, the computing device identifier, by the network device may invoke the execution of personalization module (44) within the network device. The personalization module determines associations between the data storage identifiers, computing device identifiers (if any) and content keys. As such, at Event 420, the data storage identifier (16), and alternately the computing device identifier (29), is forwarded from the network device to the network database (46). In some aspects that do not include the computing device identifier, the process may proceed directly to Event 440, as is discussed below. In alternate aspects including the computing device identifier, however, at Event 430, the personalization module determines if the data storage device has been previously associated with the computing device. (See FIGS. 8 and 9 and the related discussion for a detailed flow for associating data storage devices to computing devices and determining associations). If the data storage device has not previously been associated with any computing device, or if it has been associated with the computing device associated with the current computing device identifier, then the process proceeds to Event 440. At Event 440, the CEK and data storage device identifier look-up table (56) are utilized to retrieve the content key(s) (42) associated with the data storage device identifier. At Event 450, the content encryption keys are retrieved from the network database and communicated to the network device and, at Event 460, the network device communicates the content encryption keys to the computing device.

Once the computing device (20) has received the content encryption keys (42), at Event 470, the computing device applies the encryption keys to the protected content to decrypt or otherwise convert the content from a protected/secured form to an unprotected/in-the-clear form. As such, after Event 470, the computing device has access to at least selected portions of the content. At Event 480, the computing device may store the content encryption key in a secure portion of the computing device memory. By storing the content key in computing device memory, personalization of the data storage device within the computing device only needs to occur once. Each subsequent use of the data storage device by the computing device may rely on the key stored in the computing device memory for decryption.

Figure 6:
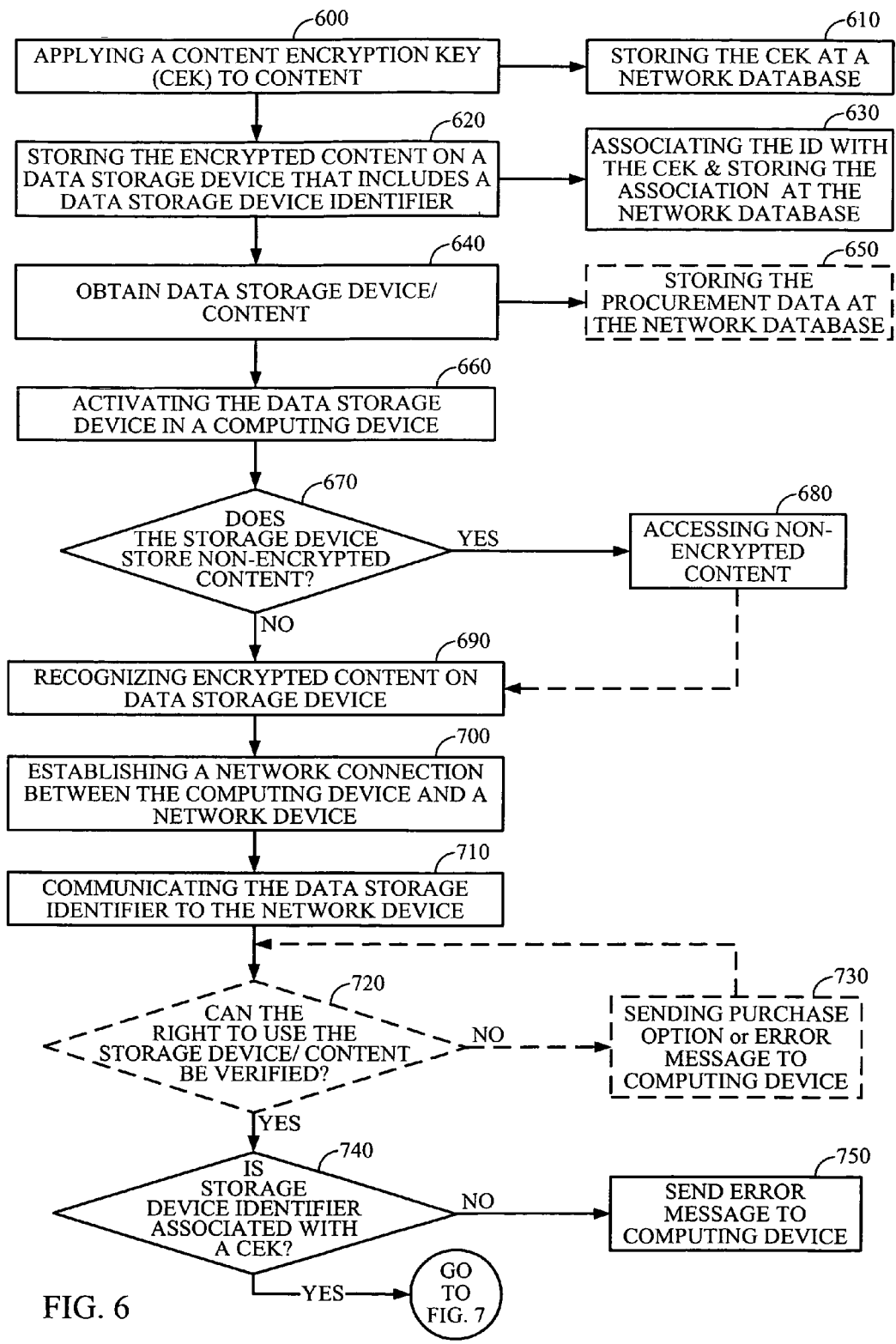
FIGS. 6 and 7 are process flow diagrams of one aspect for providing content distribution in a protected environment.
Figure 7:
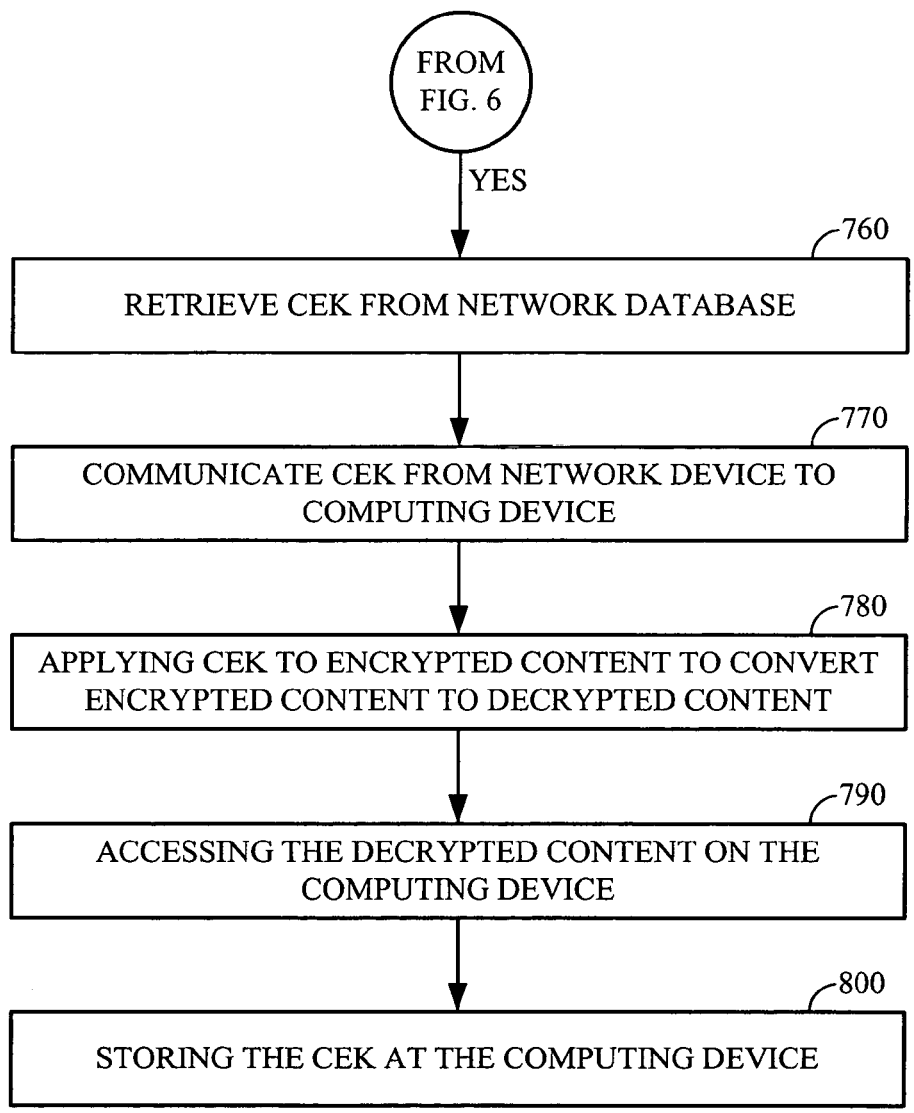

FIGS. 6 and 7 provide process flow charts, according to one aspect, for personalization of a data storage device having protected content. Referring to primarily to FIGS. 6 and 7, and secondarily to FIGS. 1 and 2, at Event 600, one or more content encryption keys (42) are applied to content and, at Event 610, the content encryption keys are stored at a network database (46). As previously discussed, the content encryption keys may be generated randomly using a conventional random number generating algorithm or the keys may be generated by using the data storage device identifier or the computing device identifier as the "seed" in a random number generator (RNG) algorithm. At Event 620, the protected content (i.e., the encrypted content) is stored on a data storage device that includes a unique identifier. At Event 630, the data storage device identifier is associated with the content encryption key(s) and the association between the identifier and the key(s) are stored at the network database.

At Event 640, the data storage device is obtained by a user who desires access to the content stored on the device. In some aspects, for example, the data storage device may be sold in a commercial transaction. In other aspects, such as in an enterprise, the data storage device may be issued to a user, such as an employee or agent. Upon a purchase or other transaction transferring the device a user, an authentication of the purchase or transfer can be accomplished by storing the purchase confirmation or transfer confirmation at the network database as procurement data. Optionally, at Event 650, the procurement data is communicated to the network database and stored therein. For example, in a commercial sale, the procurement data comprises information related to the sale, such as a purchase confirmation or a transfer confirmation, which may be communicated to the database at the point of sale/transfer by automated means, such via a communications network.

At Event 660, the data storage device is placed in communication with a computing device and the computing device attempts to access data stored on the storage device. At Decision 670, a determination is made as to whether the storage device stores non-protected content. If the data storage device stores non-protected content then, at Event 680, the non-protected content may be accessed on the computing device. If the data storage device does not include non-protected content or after accessing the non-protected content, then, at Event 690, the computing device may recognize the protected content and, at Event 700, establish network communication with a network device. The network communication connection may be established "seamlessly", i.e., without knowledge of the device user or the computing device may interface with the user asking permission to establish the network communication as a means of providing access to protected content.

Once the connection has been established, at Event 710, the data storage device identifier is communicated to the network device. At optional Decision 720, the network device may determine if the right to use the data storage device/content can be verified and/or authenticated. For example, the network device may attempt to determine if the data storage identifier has been placed in a use state, i.e. if the device has been properly sold or transferred to a user, as opposed, for example, to being a device that was stolen and is being used illicitly or out of the control of the entity that controls the use rights associated with the content. If the procurement cannot be authenticated then, at optional Event 730, the network device sends either a purchase option message to the computing device or an error/access denied message to the user. The purchase option message may allow for the super-distribution of the content on the data storage device by allowing a first user to pass the storage device to a second user, who may then validly obtain access to the protected content by making an ad hoc purchase of the rights. If the rights can be authenticated then, at Decision 740, the network device determines if the storage device identifier is associated with one or more keys. If a determination is made that the data storage device is not associated with an encryption key then, at Event 750, the network device sends an error/access denied message to the computing device.

If the determination is made that the data storage device is associated with one or more keys, then, at Event 760 (refer to FIG. 7), the key(s) are retrieved from the network database and, at Event 770, the keys are communicated to the computing device. At Event 780, the keys are applied to the protected content to decrypt the content (convert the protected content to un-protected content) and, at Event 790, the computing device grants access to the content. At Event 800, the key(s) are stored in the computing device memory for subsequent decoding of the protected content.

Figure 8:
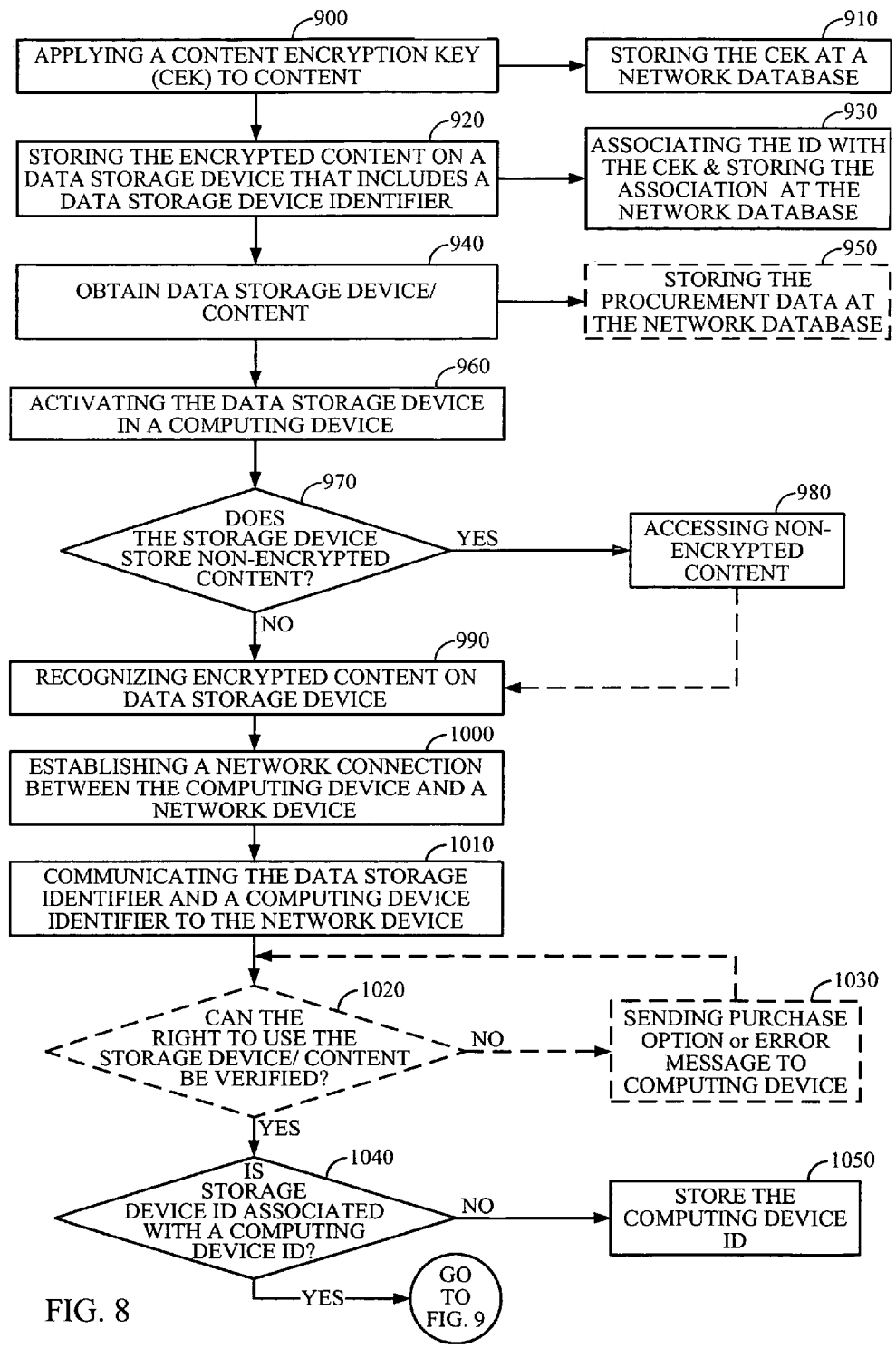
FIGS. 8 and 9 are process flow diagrams of an alternate aspect for providing content distribution in a protected environment.
Figure 9:
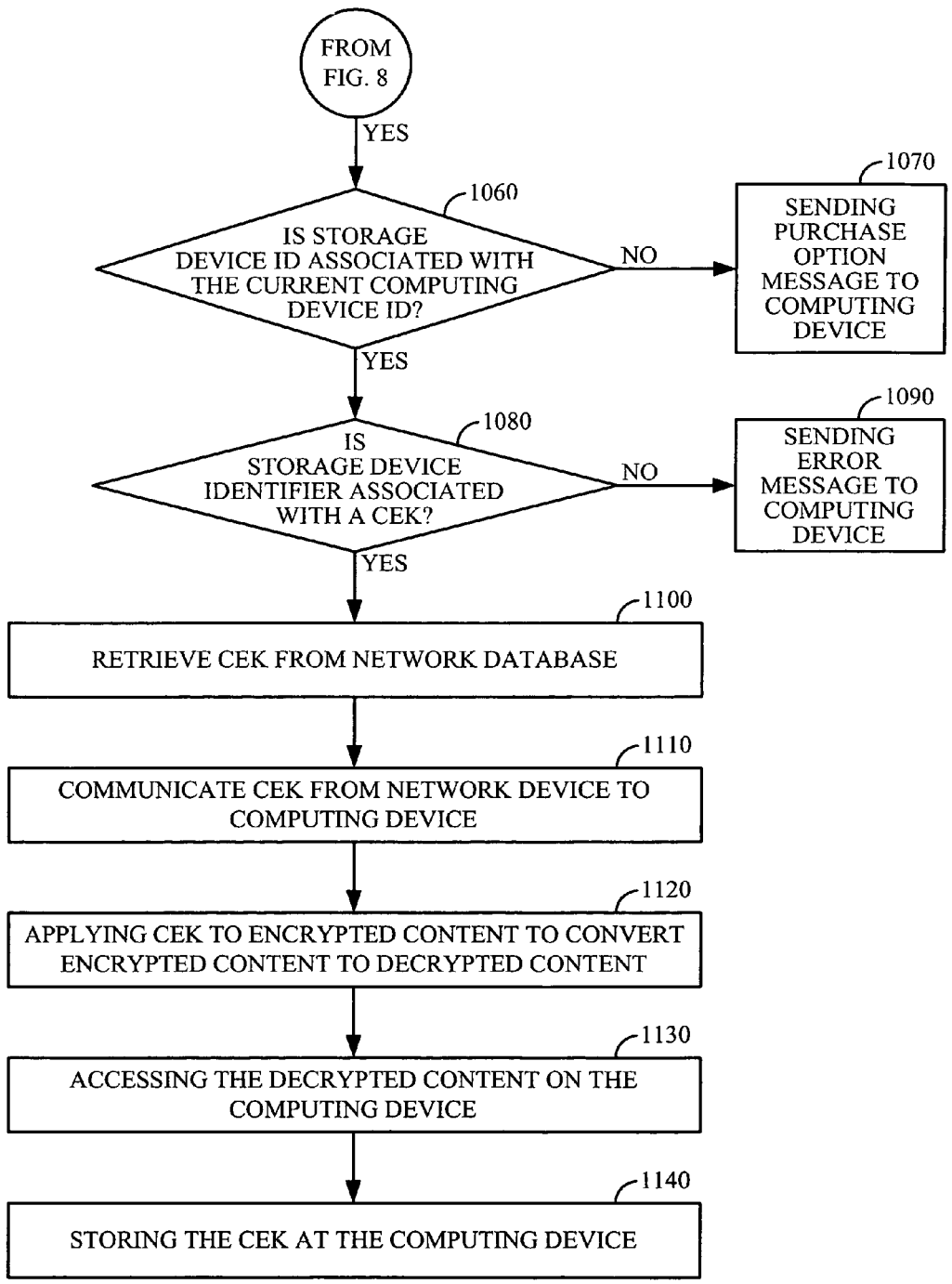

FIGS. 8 and 9 provide process flow charts, according to one aspect, for personalization of a data storage device having protected content and personalization of the storage device to a computing device. Referring primarily to FIGS. 8 and 9, and secondarily to FIGS. 1 and 2, at Event 900, one or more content encryption keys (42) are applied to content and, at Event 910, the content encryption keys are stored at a network database (46). At Event 920, the protected content (i.e., the encrypted content) is stored on a data storage device that includes a unique identifier. At Event 930, the data storage device identifier is associated with the content encryption key(s) and the association between the identifier and the key(s) are stored at the network database.

At Event 940, the data storage device is obtained by a user who desires access to the content stored on the device, as discussed above in detail (see FIG. 6, Event 640). Optionally, at Event 950, information relating to the procurement of the data storage device is communicated to the network database and stored therein.

At Event 960, the data storage device is placed in communication with a computing device and the computing device attempts to access data stored on the storage device. At Decision 970, a determination is made as to whether the storage device stores non-protected content. If the data storage device stores non-protected content then, at Event 980, the non-protected content may be accessed on the computing device. If the data storage device does not include non-protected content or after accessing the non-protected content, then, at Event 990, the computing device may recognize the protected content and, at Event 1000, establish network communication with a network device. The network communication connection may be established "seamlessly", i.e., without knowledge of the device user or the computing device may interface with the user asking permission to establish the network communication as a means of providing access to protected content.

Once the connection has been established, at Event 1010, the data storage device identifier and the computing device identifier are communicated to the network device. At optional Decision 1020, the network device determines if the rights of the user to the data storage device/content can be authenticated, as discussed above in detail (See FIG. 6, Event 720). If the rights cannot be authenticated then, at optional Event 1030, the network device sends either a purchase option message to the computing device or an error/access denied message to the user. If the rights can be authenticated then, at Decision 1040, the network device determines if the data storage device is associated with any computing device or a pre-determined maximum number of computing devices. If the determination is made that the data storage device has not been associated with a computing device or the pre-determined maximum number of computing devices has yet to be attained, then at Event 1050, the network device stores an association between the computing device and the data storage device.

If a determination is made that the data storage device 10 is associated with any computing device 20 or the pre-determined maximum number of computing devices associations has been achieved, then at Decision 1060 (refer to FIG. 9), the network device 40 determines if the data storage device is associated with the currently communicating computing device 20. If a determination is made that the data storage device 10 is not associated with the current communicating computer device 20 then, at Event 1070, the network device 40 sends a purchase option message or an error/access denied message to the computing device 20. If a determination is made that the data storage device 10 is associated with the current communicating computer device 20 then, at Decision 1080, the network device 40 determines of the storage device identifier 16 is associated with one or more keys. If a determination is made that the data storage device 10 is not associated with an encryption key then, at Event 1090, the network device 40 sends an error/access denied message to the computing device 20.

If the determination is made that the data storage device is associated with one or more keys then, at Event 1100, the key(s) are retrieved from the network database and, at Event 1110, the keys are communicated to the computing device. At Event 1120, the keys are applied to the protected content to decrypt the content (converting the protected content to un-protected content) and, at Event 1130, the computing device grants access to the content. At Event 1140, the one or more keys may be stored in a secure portion of the computing device memory for subsequent decoding of the protected content.

Figure 10:
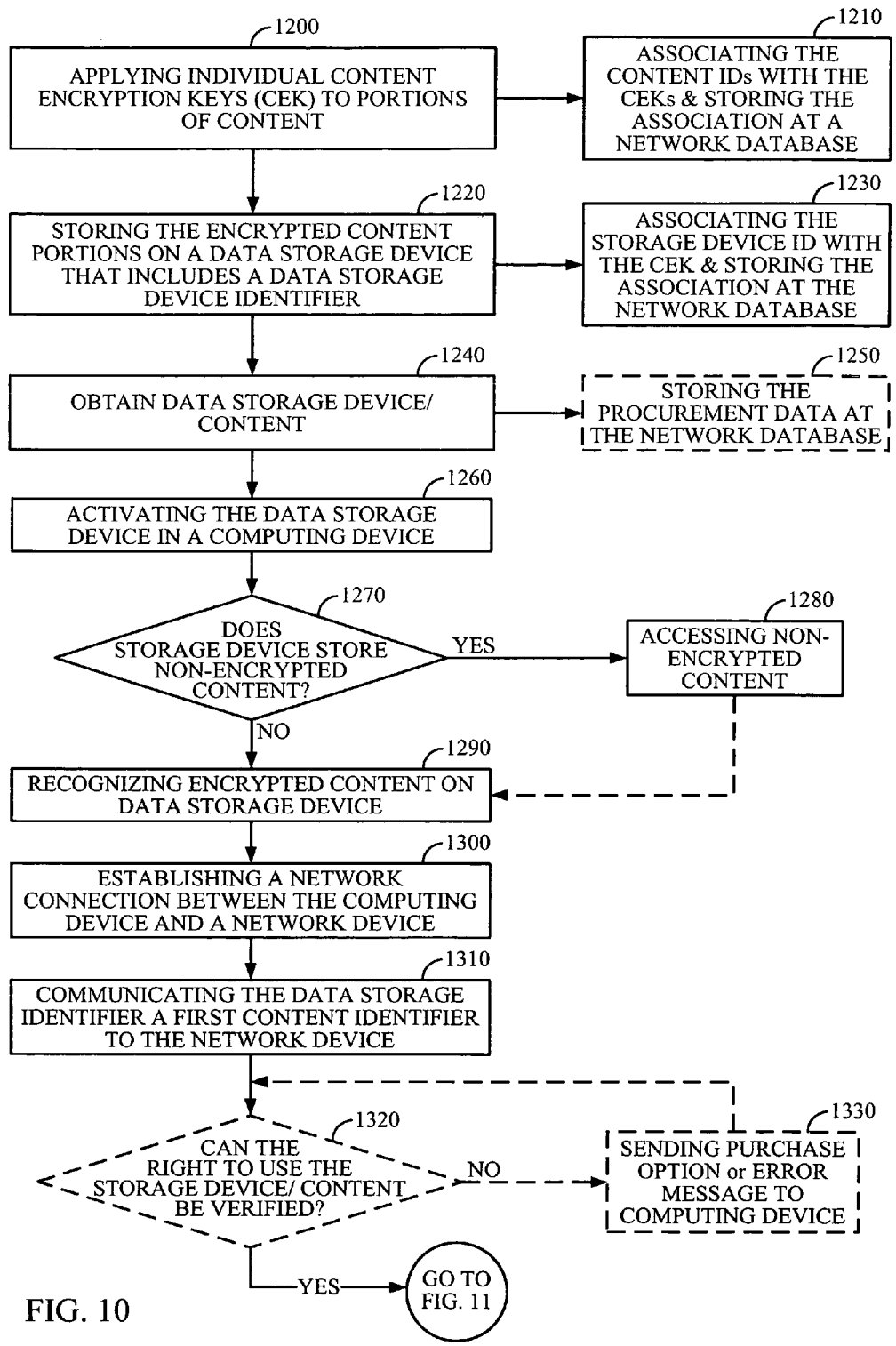
FIGS. 10-12 are process flow diagrams of yet another alternate aspect for providing content distribution in a protected environment.
Figure 11:
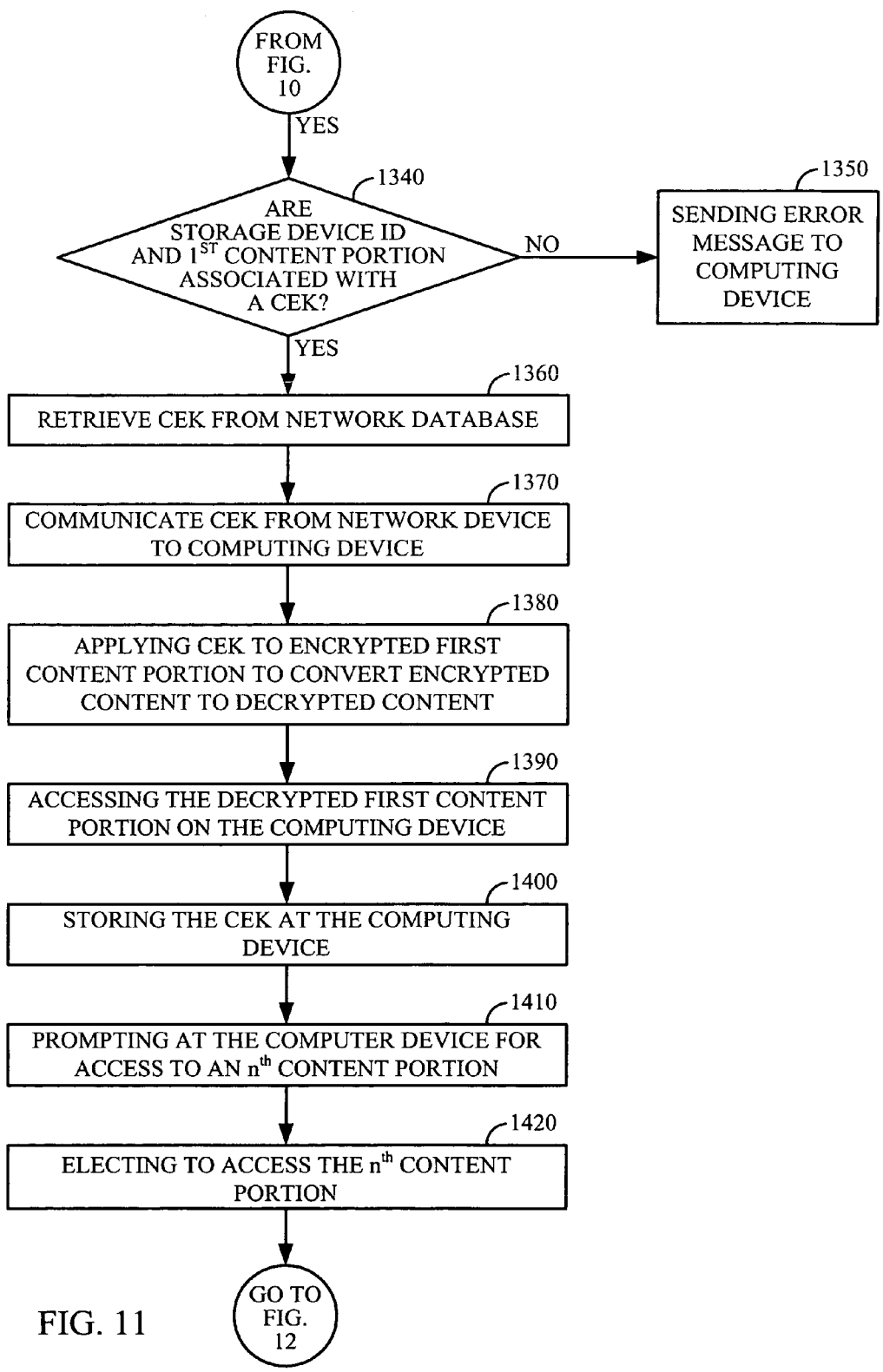
Figure 12:
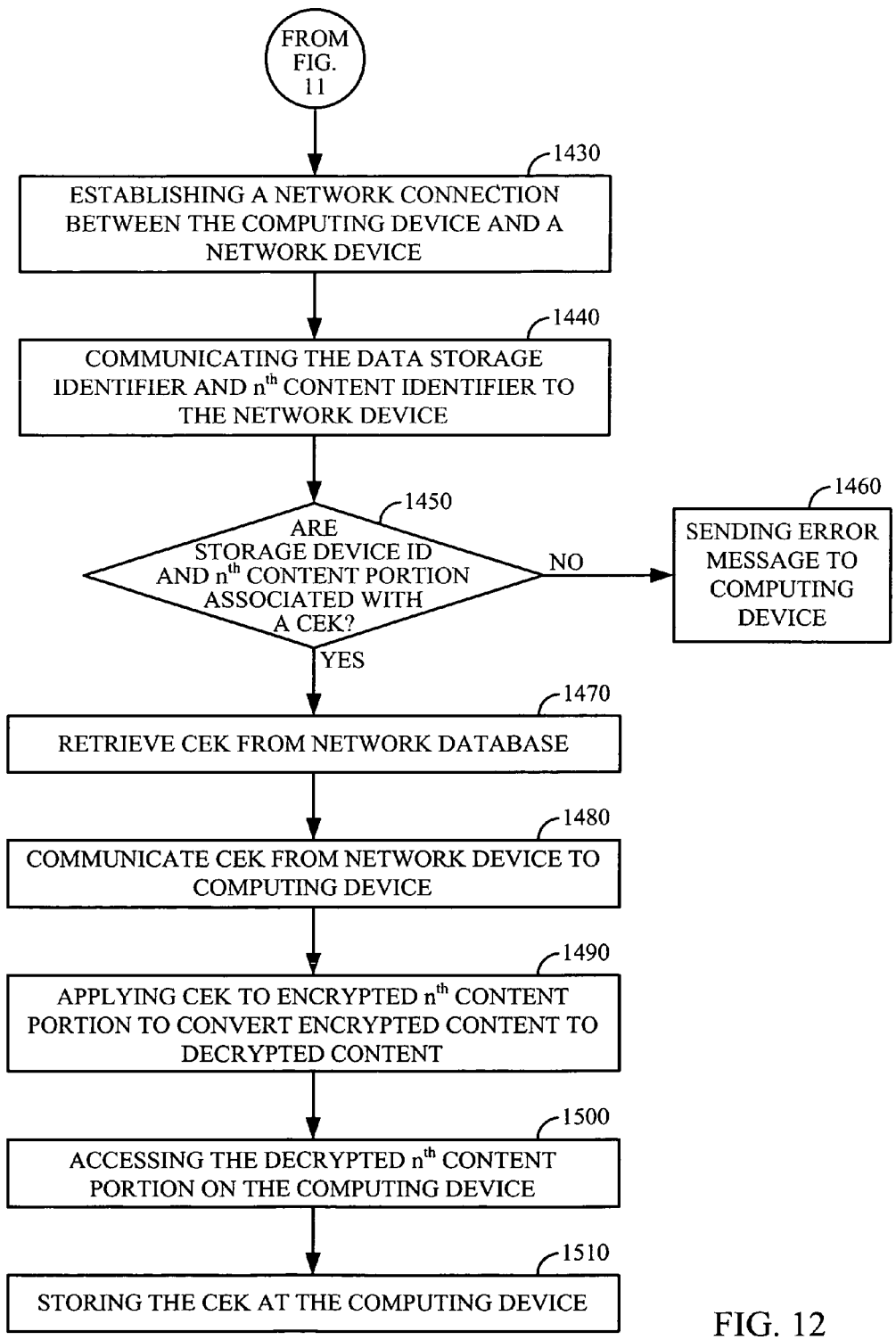

FIGS. 10-12 provide process flow charts, according to an alternate aspect, for personalization of a data storage device having protected content. In the described flow the data storage devices includes multiple protected content portions with each portion being individually accessible. Referring primarily to FIGS. 10-12, and secondarily to FIGS. 1 and 2, at Event 1200, one or more content encryption keys (42) are applied to each content portion and, at Event 1210, the content encryption keys are associated with the corresponding content portion identifiers and the associations are stored at a network database (46). At Event 1220, the protected content portions are stored on a data storage device that includes a unique identifier. At Event 1230, the data storage device identifier is associated with the content encryption key(s) and the association between the storage device identifier and the content key(s) are stored at the network database.

At Event 1240, the data storage device is obtained by a user who desires access to the content stored on the device, as discussed above in detail. Optionally, at Event 1250, the purchase confirmation or transfer confirmation is communicated to the network database and stored therein. Typically, information relating to the procurement of the data storage device by the user is communicated to the database at the point of sale/transfer by automated means, such via a communications network.

At Event 1260, the data storage device is placed in communication with a computing device and the computing device attempts to access data stored on the storage device. At Decision 1270, a determination is made as to whether the storage device stores non-protected content. If the data storage device stores non-protected content then, at Event 1280, the non-protected content may be accessed on the computing device. If the data storage device does not include non-protected content or after accessing the non-protected content, then, at Event 1290, the computing device may recognize the protected content and, at Event 1300, establish network communication with a network device. The network communication connection may be established "seamlessly", i.e., without knowledge of the device user or the computing device may interface with the user asking permission to establish the network communication as a means of providing access to protected content.

Once the connection has been established, at Event 1310, the data storage device identifier and the first protected content portion identifier is communicated to the network device. At optional Decision 1320, the network device determines if the rights of the user to the data storage device/content can be authenticated, as discussed above in detail. If the rights cannot be authenticated then, at optional Event 1330, the network device sends either a purchase option message to the computing device or an error/access denied message to the user. If the rights can be authenticated then, at Decision 1340 (refer to FIG. 11), the network device determines if the storage device identifier and the first protected content portion identifier are associated with one or more keys. If a determination is made that the data storage device or the content portion are not associated with an encryption key then, at Event 1350, the network device sends an error/access denied message to the computing device.

If the determination is made that the data storage device and the first protected content portion are associated with one or more predetermined keys then, at Event 1360, the key(s) are retrieved from the network database and, at Event 1370, the keys are communicated to the computing device. At Event 1380, the keys are applied to the first protected content portion to decrypt the first portion of content (convert the protected content to un-protected content) and, at Event 1390, the computing device grants access to the first content portion. At Event 1400, the key(s) may be stored in a secure portion of the computing device memory for subsequent decoding of the first protected content portion.

At Event 1410, the computing device provides a user prompt asking if the user desires to access additional protected content portions. Access to the additional protected content portions may require the user to purchase the protected content portions or otherwise gain a license to access the additional content portions. For example, the additional content portions may be additional audio or video files associated with the initial audio or video file (i.e., the first protected content portion), an additional game level associated with the initial game application, an additional enhancement/feature for the initial game application or the like. The computing device may be configured to prompt the user periodically or after the user has completed or executed the initial content in its entirety.

At Event 1420, the user elects to access one or more of the additional protected content portions (subsequently referred to herein as the "nth" portion) and, in some aspects, such an election may require additional payment. In alternate aspects, the additional protected portions may be configured to be automatically accessed without the need for prompting or election (i.e., keys retrieved and applied automatically). Such automatic access may occur at predetermined intervals or upon occurrence of a predetermined event.

At Event 1430 (refer to FIG. 12), a network connection is established between the computing device and a network device. Once the connection has been established, at Event 1440, the data storage device identifier and the "nth" protected content portion identifier are communicated to the network device. At Decision 1450, the network device determines if the storage device identifier and the "nth" protected content portion identifier are associated with one or more keys. If a determination is made that the data storage device or the content portion are not associated with an encryption key then, at Event 1460, the network device sends an error/access denied message to the computing device.

If the determination is made that the data storage device and the "nth" protected content portion are associated with one or more predetermined keys then, at Event 1470, the key(s) are retrieved from the network database and, at Event 1480, the keys are communicated to the computing device. At Event 1490, the keys are applied to the "nth" protected content portion to decrypt the "nth" portion of content (convert the protected content to un-protected content) and, at Event 1500, the computing device grants access to the "nth" content portion. At Event 1510, the key(s) may be stored in a secure portion of the computing device memory for subsequent decoding of the "nth" protected content portion.

Thus, the described aspects provide for methods, devices, apparatus, computer-readable media and processors that protect the distribution of media content. The simplistic approach to the present aspects allows for media content to be encrypted and the associated content encryption keys stored and accessible either remotely at a networked database or internally with data storage device memory. Once encrypted, access to the content encryption keys is granted by determining association between the content encryption keys and data storage device identification and, optionally, computing device identification. The present aspects provide a method for securing a large volume of media content on a data storage device by protecting or encrypting primary or important portions of the content, such as executables or audio/video files, while allowing secondary or less important portions of the content to remain non-protected.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, many modifications and other embodiments of the invention may come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for accessing content, the method comprising:
    Forwarding a storage device identifier to a network device, wherein the storage device identifier identifies a storage device that includes protected content;
    receiving at least a reference to a cryptographic mechanism from the network device based on an association with the storage device identifier, the cryptographic mechanism configured to provide access to less than all of the protected content on the storage device; and
    accessing at least a portion of the protected content with the cryptographic mechanism.

2. The method of claim 1, further comprising:
    forwarding to the network device a request for access to at least one other portion of the protected content different from the portion accessed with the cryptographic mechanism, the request comprising at least one of the storage device identifier and a computing device identifier, the computing device identifier associated with a computing device operable to receive the storage device;

receiving at least a reference to at least one other cryptographic mechanism from the network device based on an association with at least one of the storage device identifier and the computing device identifier, the other cryptographic mechanism corresponding to at least the other portion of the protected content; and accessing at least the other portion of the protected content with the other cryptographic mechanism.

3. The method of claim 1, further comprising providing payment information prior to receiving the cryptographic mechanism, the payment information corresponding to a payment to access at least the portion of the protected content.

4. The method of claim 2, further comprising providing payment information prior to receiving the other cryptographic mechanism, the payment information corresponding to a payment to access at least the other portion of the protected content.

5. The method of claim 1, wherein receiving at least the reference to the cryptographic mechanism from the network device is further based on a confirmation of an availability for use of the storage device.

6. The method of claim 5, wherein the confirmation of the availability for use of the storage device is based on an association between the storage device identifier and a procurement transaction involving the storage device.

7. The method of claim 1, further comprising forwarding a computing device identifier to the network device, the computing device identifier associated with a computing device operable to receive the storage device, and wherein receiving the reference to the cryptographic mechanism from the network device further comprises receiving at the computing device based on an association with the computing device identifier.

8. The method of claim 7, further comprising forwarding another computing device identifier to the network device, the other computing device identifier associated with another computing device operable to receive the storage device, and wherein receiving at least the reference to the cryptographic mechanism from the network device further comprises receiving at the other computing device based on an association with the other computing device identifier.

9. The method of claim 1, wherein receiving at least the reference to the cryptographic mechanism further comprises receiving the cryptographic mechanism.

10. The method of claim 1, wherein the protected content comprises content obscured by a predetermined cryptographic mechanism.

11. The method of claim 1, wherein the receiving the storage device comprising the storage device identifier and protected content further comprises the receiving the storage device comprising the storage device identifier, protected content and non-protected content.

12. The method of claim 11, further comprising the accessing the non-protected content, wherein the non-protected content includes preview content.

13. The method of claim 11, further comprising accessing the non-protected content, wherein the non-protected content includes limited-use content.

14. The method of claim 13, wherein the non-protected content includes limited-use content that further defines the limited-use content as being limited-use content based on a computing device that receives the storage device.

15. A non-transitory computer readable medium tangibly storing a sequence of instructions that, when executed, cause a computer device to perform the actions of:

forwarding a storage device identifier to a network device, wherein the storage device identifier identifies a storage device that includes protected content;

receiving at least a reference to a cryptographic mechanism from the network device based on an association with the storage device identifier, the cryptographic mechanism configured to provide access to less than all of the protected content on the storage device; and accessing at least a portion of the protected content with the cryptographic mechanism.

16. A wireless device, comprising:

means for forwarding a storage device identifier to a network device, wherein the storage device identifier identifies a storage device that includes protected content;

means for receiving at least a reference to a cryptographic mechanism from the network device based on an association with the storage device identifier, the cryptographic mechanism configured to provide access to less than all of the protected content on the storage device; and means for accessing at least a portion of the protected content with the cryptographic mechanism.

17. A computing device, comprising:

a processing engine; and a content access initiator module executable by the processing engine, the content access initiator module operable to recognize protected content stored on a storage device, communicate a storage device identifier to a network device, receive from the network device at least a reference to a first cryptographic mechanism associated with the storage device identifier, the first cryptographic mechanism configured to provide access to less than all of the protected content on the storage device, and apply the first cryptographic mechanism to at least a portion of the protected content to convert the portion of the protected content to a portion of un-protected content.

18. The computing device of claim 17, further comprising the storage device identifier and the first cryptographic mechanism each stored in communication with the content access initiator module, wherein the content access initiator module is further operable to communicate, wirelessly, the storage device identifier to the network device and receive, wirelessly, from the network device at least the reference to the first cryptographic mechanism associated with the storage device identifier.

19. The computing device of claim 17, further comprising a computing device identifier associated with the computing device, wherein the content access initiator module is further operable to communicate the computing device identifier and the storage device identifier to the network device, and wherein at least the reference to the first cryptographic mechanism corresponds to a predetermined association between the computing device identifier and the storage device identifier.

20. The computing device of claim 17, further comprising the storage device in removable communication with the computing device, the storage device comprising the storage device identifier and the protected content.

21. The computing device of claim 20, wherein the storage device further comprises non-protected content, wherein the non-protected content includes preview content.

22. The computing device of claim 20, wherein the storage device further comprises non-protected content, wherein the non-protected content includes limited-use content.

23. The computing device of claim 22, wherein the limited-use content limits use based on which computing device is associated with the storage device.

24. The computing device of claim 20, wherein the storage device is selected from a group consisting of a flash media card, a compact disc (CD) and a digital video disc (DVD).

25. The computing device of claim 20, wherein the protected content comprises a plurality of protected content portions, each corresponding to one of a plurality of cryptographic mechanisms, wherein the content access initiator module is operable to receive at least one of the plurality of cryptographic mechanisms corresponding to at least one of the plurality of protected content portions.

26. The computing device of claim 17, further comprising the first cryptographic mechanism and a second cryptographic mechanism stored in communication with the content access initiator module, wherein the protected content comprises the portion of the protected content and another portion of the protected content, wherein the content access initiator module is operable to apply the second cryptographic mechanism to at least the other portion of the protected content to convert the other portion of the protected content to another portion of un-protected content.

27. The computing device of claim 26, further comprising a memory having payment information, wherein the content access initiator module is further operable to forward the payment information to the network device in exchange for the second cryptographic mechanism.

28. The computing device of claim 17, wherein the computing device comprises a wireless device operable on a wireless network.

29. A method for distributing content in a protected environment, the method comprising:
obtaining an association between a first storage device identifier and a cryptographic mechanism, the first storage device identifier identifying at least a portion of a storage device;
obtaining at least a reference to the cryptographic mechanism;
receiving a request from a computing device for access to at least a portion of a protected content, the request comprising a second storage device identifier, the second storage device identifier identifying a different portion of the storage device than the first storage device identifier; and
forwarding at least the reference to the cryptographic mechanism to the computing device based on a correspondence between at least a portion of the second storage device identifier and the first storage device identifier.

30. The method of claim 29, further comprising:
obtaining an association between the first storage device identifier, at least one other portion of the protected content, and at least one other cryptographic mechanism;
obtaining at least a reference to the other cryptographic mechanism;
receiving a request from the computing device for access to at least the one other portion of the protected content, the request comprising the second storage device identifier; and
forwarding at least the reference to the other cryptographic mechanism to the computing device based on the correspondence between the at least a portion of the second storage device identifier and the first storage device identifier.

31. The method of claim 29, further comprising:
obtaining an association between a computing device identifier, the first storage device identifier and the cryptographic mechanism, the computing device identifier associated with the computing device;
wherein receiving the request from the computing device further comprises one other computing device identifier; and
wherein the forwarding at least the reference to the cryptographic mechanism to the computing device further comprises forwarding based on a correspondence between the computing device identifier and the one other computing device identifier.

32. The method of claim 29, further comprising:
obtaining an association between a procurement transaction, the first storage device identifier and the cryptographic mechanism, the procurement transaction associated with the computing device; and
wherein the forwarding at least the reference to the cryptographic mechanism to the computing device further comprises forwarding based on correspondence between the at least the portion of the second storage device identifier, the first storage device identifier, and the procurement transaction.

33. The method of claim 29, further comprising:
receiving a request from at least one other computing device for access to at least a portion of the protected content, the request comprising a third storage device identifier; and
forwarding a purchase option message to the at least one other computing device based on a lack of correspondence between at least the portion of the third storage device identifier, and the first storage device identifier.

34. The method of claim 33, further comprising receiving payment information from one other computing device in response to a purchase option message, and forwarding at least the reference to the cryptographic mechanism to the computing device based on the received payment information.

35. The method of claim 29, wherein the forwarding at least the reference to the cryptographic mechanism further comprises forwarding the cryptographic mechanism.

36. The method of claim 29, wherein the obtaining the association between the first storage device identifier and the cryptographic mechanism further comprises obtaining an association between a plurality of portions of the protected content and a corresponding plurality of cryptographic mechanisms, wherein each of the plurality of portions of the protected content corresponds to at least one cryptographic mechanism in the plurality of the cryptographic mechanisms.

37. The method of claim 29, further comprising:
loading unprotected content on the storage device having the first storage device identifier;
obscuring at least a portion of the unprotected content with the cryptographic mechanism, thereby defining at least the portion of the protected content; and
defining an association between the first storage device identifier and the cryptographic mechanism.

38. The method of claim 29, further comprising:
storing one or more procurement transaction data, wherein each procurement transaction data is associated with a corresponding portion of protected data; and
recognizing authorization of the computing device to access protected content portions based on the stored procurement transaction data.

39. The method of claim 38, further comprising communicating protected content portion-related data to the computing device based on recognition of the authorization to access protected content portions.

40. The method of claim 29, further comprising:
monitoring content access activity of the computing device; and
communicating, to the computing device, content purchase recommendations based on the monitoring of the content access activity.

41. The method of claim 40, further comprising:
monitoring environmental attributes of the computing device; and
communicating, to the computing device, content purchase recommendations based on the monitoring of the environmental attributes.

42. A non-transitory computer readable medium tangibly storing a sequence of instructions that, when executed, cause a computer device to perform the actions of:
obtaining an association between a first storage device identifier and a cryptographic mechanism, the first storage device identifier identifying at least a portion of a storage device;
obtaining at least a reference to the cryptographic mechanism;
receiving a request from a computing device for access to at least a portion of a protected content, the request comprising a second storage device identifier, the second storage device identifier identifying a different portion of the storage device than the first storage device identifier; and
forwarding at least the reference to the cryptographic mechanism to the computing device based on a correspondence between at least a portion of the second storage device identifier and the first storage device identifier.

43. At least one processor configured to perform the actions of:
obtaining an association between a first storage device identifier and a cryptographic mechanism, the first storage device identifier identifying at least a portion of a storage device;
obtaining at least a reference to the cryptographic mechanism;
receiving a request from a computing device for access to at least a portion of a protected content, the request comprising a second storage device identifier, the second storage device identifier identifying a different portion of the storage device than the first storage device identifier; and
forwarding at least the reference to the cryptographic mechanism to the computing device based on a correspondence between at least a portion of the second storage device identifier and the first storage device identifier.

44. A network device, comprising:
means for obtaining an association between a first storage device identifier and a cryptographic mechanism, the first storage device identifier identifying at least a portion of a storage device;
means for obtaining at least a reference to the cryptographic mechanism;
means for receiving a request from a computing device for access to at least a portion of a protected content, the request comprising a second storage device identifier, the second storage device identifier identifying a different portion of the storage device than the first storage device identifier; and
means for forwarding at least the reference to the cryptographic mechanism to the computing device based on a correspondence between at least a portion of the second storage device identifier and the first storage device identifier.

45. A network device, comprising:
a processing engine; and
a personalization module executed by the processing engine, the personalization module operable to receive a storage device identifier from a networked computing device, the storage device identifier identifying a storage device that includes protected content, to determine a cryptographic mechanism associated with the storage device identifier and communicate at least a reference to the cryptographic mechanism to the networked computing device, the cryptographic mechanism configured to provide access to less than all of the protected content on the storage device.

46. The network device of claim 45, further comprising a network database in communication with the personalization module, the network database comprising the storage device identifier in association with at least the reference to the cryptographic mechanism.

47. The network device of claim 46, wherein the network database further comprises an identification of a plurality of portions of a protected content in association with a plurality of cryptographic mechanisms, wherein the plurality of portions of the protected content are further associated with the storage device identifier, wherein the personalization module is further operable to receive the identification of one of the plurality of portions of the protected content, and wherein the reference to the cryptographic mechanism further comprises a reference to one of the plurality of cryptographic mechanisms corresponding to the identified one of the plurality of portions of the protected content.

48. The network device of claim 46, wherein the network database further comprises a computing device identifier associated with the storage device identifier, wherein the personalization module is further operable to communicate at least the reference to the cryptographic mechanism to a computing device if the computing device corresponds to the computing device identifier.

49. The network device of claim 46, wherein the network database further comprises procurement information associated with the storage device identifier, wherein the personalization module is further operable to communicate at least the reference to the cryptographic mechanism to a computing device if the computing device is associated with the procurement information.

50. A method of distributing content, comprising:
loading unprotected content on a storage device having a storage device identifier, the storage device configured for removable communication with a computing device;
obscuring at least a portion of the unprotected content with a cryptographic mechanism, thereby defining at least a portion of a protected content;
defining an association between the storage device identifier and the cryptographic mechanism; and
forwarding the defined association to a network device operable to provide access to at least the portion of the protected content to a networked computing device having the storage device identifier.

51. The method of claim 50, wherein the obscuring further comprises obscuring a plurality of portions of the unprotected content with at least one of a plurality of cryptographic mechanisms, thereby defining a plurality of portions of the protected content, wherein the defining the association further comprises associating the plurality of portions of the protected content with the corresponding one of the plurality of cryptographic mechanisms used to obscure the respective portion, and wherein the forwarding the defined association further comprises forwarding to the network device operable to provide access to a requested portion of the protected content.

52. A non-transitory computer-readable storage medium, comprising:
a memory comprising a data storage device identifier and protected content,
wherein the protected content is convertible to unprotected content based on a cryptographic mechanism that is received from a network device upon receipt of the data storage device identifier, the cryptographic mechanism configured to provide access to less than all of the protected content on the non-transitory computer-readable storage medium.

53. The non-transitory computer-readable storage medium of claim 52, wherein the non-transitory computer-readable storage medium is selected from a group consisting of a flash media card, a compact disc (CD), and a digital video disc (DVD).

54. The non-transitory computer-readable storage medium of claim 52, wherein the protected content is selected from a group consisting of a gaming application, an executable application, a text file, an audio file, an image file, and a video file.

55. The non-transitory computer-readable storage medium of claim 52, wherein the non-transitory computer-readable storage medium is a removable non-transitory computer-readable storage medium that is capable of being removably secured and read by a computing device.

56. The non-transitory computer-readable storage medium of claim 55, wherein the computing device is operable to recognize the protected content, communicate the data storage device identifier to the network device, receive the cryptographic mechanism from the network device and apply the cryptographic mechanism to the protected content.

57. The non-transitory computer-readable storage medium of claim 52, wherein the protected content further comprises a plurality of protected content, and each of the plurality of protected content has a content identifier.

58. The non-transitory computer-readable storage medium of claim 57, wherein at least a portion of the plurality of protected content is convertible to unprotected content by communicating a respective content identifier to the network device that responds with one of a plurality of cryptographic mechanisms corresponding with the respective content identifier.

59. The non-transitory computer-readable storage medium of claim 52, wherein the memory further comprises non-protected content, and the non-protected content includes preview content.

60. The non-transitory computer-readable storage medium of claim 52, wherein the memory further comprises non-protected content, and the non-protected content includes limited-use content.

61. The method of claim 29, wherein the second storage device identifier identifies at least a portion, and less than all, of the protected content on the storage device.

* * * * *